United States Patent Office 3,737,443
Patented June 5, 1973

3,737,443
ω-GUANIDINO ACID AMIDE DERIVATIVES AND MANUFACTURING THE SAME
Sadao Hashimoto, Itano-gun, Katsushi Okada and Ryuji Sakakibara, Naruto, and Setsuro Fujii, Tokushima, Japan, assignors to Taiho Pharmaceutical Company Limited, Chiyoda-ku, Tokyo-to, Japan
No Drawing. Filed Apr. 2, 1970, Ser. No. 25,241
Claims priority, application Japan, Apr. 2, 1969, 44/25,805
Int. Cl. C07c 103/30
U.S. Cl. 260—404.5                5 Claims

ABSTRACT OF THE DISCLOSURE

The present ω-guanidino acid amide derivatives are new compounds having a structural formula of

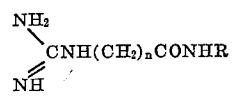

wherein R is an alkyl of 2 to 18 carbon atoms, a phenylalkyl($C_1$ to $C_4$) or a phenyl containing or not containing a substitute of hydroxyl, alkyl($C_1$ to $C_4$) or haloalkyl($C_1$ to $C_4$), and $n$ is an integer of 1 to 10. The above derivatives and onium salts thereof are excellent in pharmacological activity, particularly in antagonism to bradykinin and in inhibition on edema, and thus useful as anti-inflammatory agent.

---

This invention relates to new and useful ω-guanidino acid amide derivatives and onium salts thereof having high order of pharmacological activity and to a process for manufacturing them.

The ω-guanidino acid amide derivatives of the invention are of the following formula:

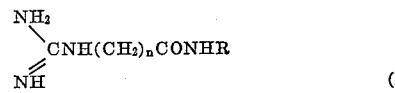      (I)

wherein R is an alkyl of 2 to 18 carbon atoms, phenylalkyl($C_1$ to $C_4$) or a phenyl containing or not containing a substitute of hydroxyl, alkyl($C_1$ to $C_4$) or haloalkyl($C_1$ to $C_4$), and $n$ is an integer of 1 to 10.

The present amide derivatives having the above Formula I and onium salts thereof are excellent in pharmacological activity, particularly in antagonism to bradykinin and in inhibition on edema, and thus useful as anti-inflammatory agent.

The representative examples of the amide derivatives of the invention are listed in the Table 1 below in which the melting points show those of acetic acid salts of the respective compounds, unless otherwise specified.

TABLE 1

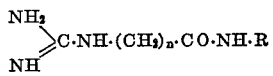

| No. | —(CH$_2$)$_n$— | R | Melting point (° C.) |
|---|---|---|---|
| I-1 | —(CH$_2$)$_5$— | —(CH$_2$)$_3$CH$_3$ | 105–108 |
| I-2 | —(CH$_2$)$_5$— | —(CH$_2$)$_5$CH$_3$ | 84–86 |
| I-3 | —(CH$_2$)$_5$— | —(CH$_2$)$_7$CH$_3$ | 86–88 |
| I-4 | —(CH$_2$)$_5$— | —(CH$_2$)$_8$CH$_3$ | 74–76 |
| I-5 | —(CH$_2$)$_5$— | —(CH$_2$)$_9$CH$_3$ | 88–89 |
| I-6 | —(CH$_2$)$_5$— | —(CH$_2$)$_{11}$CH$_3$ | 99–102 |
| I-7 | —(CH$_2$)$_5$— | —CH$_2$CH$_2$CHCH$_2$C(CH$_3$)$_2$—CH$_3$ (with CH$_3$ branches) | [1] 137–138 |
| I-8 | —(CH$_2$)$_5$— | —(CH$_2$)$_{13}$CH$_3$ | [2] 93–95 |
| I-9 | —(CH$_2$)$_5$— | —CH$_2$CH$_2$—⟨phenyl⟩ | 44–47 |
| I-10 | —(CH$_2$)$_5$— | —⟨phenyl⟩—OH | 154–156 |
| I-11 | —(CH$_2$)$_5$— | —⟨phenyl with CF$_3$⟩ | [3] 161–163 |
| I-12 | —(CH$_2$)$_{10}$— | —(CH$_2$)$_3$CH$_3$ | 91–95 |
| I-13 | —(CH$_2$)$_{10}$— | —(CH$_2$)$_3$CH$_3$ | [4] 108–111 |
| I-14 | —(CH$_2$)$_{10}$— | —(CH$_2$)$_5$CH$_3$ | 97–105 |

[1] As hemihydrate.
[2] As monohydrate.
[3] The melting point of the compound No. I-7 shows that of picric acid salt.
[4] The melting point of the compound No. I-11 shows that of hydrochloric acid salt.

Of these compounds particularly preferable are ε-guanidinocaproyl-n-hexylamide (I-2), ε-guanidinocaproyl-n-octylamide (I-3), ε-guanidinocaproyl-n-nonylamide (I-4), ε-guanidinocaproyl-n-decylamide (I-5), ε-guanidinocaproyl-n-dodecylamide (I-6), etc.

The amide derivative of the invention may be prepared by various methods, but it is preferable to produce it by reducing an ω-nitroguanidino acid amide derivative having the Formula II below with hydrogen gas, the reaction being shown in the following equation:

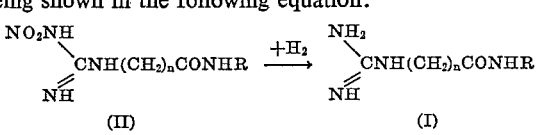

wherein R and $n$ are the same as defined before.

This reaction may be conducted in various manners, for example, by introducing hydrogen gas into a solvent solution of the compound (II). Preferable solvents are formic acid, acetic acid, propionic acid, a mixture of methanol and hydrochloric acid, etc. and by the use of such acid as a solvent the present amide derivatives can be obtained in the form of onium salts which are more excellent in stability and water-solubility than those of the amides themselves. The temperature of the reduction may be in the range of a room temperature to a boiling point of the solvents used, but preferably it is performed at a moderately elevated temperature of about 60 to 100° C. To accelerate the reaction reducing catalysts such as palladium black, palladium charcoal, etc. may be used. The compound (II) used as a starting material in the above reaction is an oily or crystalline novel substance insoluble in water and examples thereof are listed in the following Table 2 below:

TABLE 2

| No. | —(CH$_2$)$_n$— | R | Melting point (° C.) |
|---|---|---|---|
| II-1 | —(CH$_2$)$_5$— | —(CH$_2$)$_3$CH$_3$ | 108–109 |
| II-2 | —(CH$_2$)$_5$— | —(CH$_2$)$_5$CH$_3$ | 113–114 |
| II-3 | —(CH$_2$)$_5$— | —(CH$_2$)$_7$CH$_3$ | 118–119.5 |
| II-4 | —(CH$_2$)$_5$— | —(CH$_2$)$_8$CH$_3$ | 125–126 |
| II-5 | —(CH$_2$)$_5$— | —(CH$_2$)$_9$CH$_3$ | 127–128 |
| II-6 | —(CH$_2$)$_5$— | —(CH$_2$)$_{11}$CH$_3$ | 129–130 |
| II-7 | —(CH$_2$)$_5$— | —CH$_2$CH$_2$CHCH$_2$C(CH$_3$)$_2$—CH$_3$ | 92–93 |

TABLE 2—Continued

| No. | —(CH$_2$)$_n$— | R | Melting point (° C.) |
|---|---|---|---|
| II-8 | —(CH$_2$)$_5$— | —(CH$_2$)$_{13}$CH$_3$ | 128–130 |
| II-9 | —(CH$_2$)$_5$— | —CH$_2$CH$_2$—C$_6$H$_5$ | 116–117 |
| II-10 | —(CH$_2$)$_5$— | —C$_6$H$_4$—OH | 203–204 |
| II-11 | —(CH$_2$)$_5$— | —C$_6$H$_4$—CF$_3$ | 161–163 |
| II-12 | —(CH$_2$)$_{10}$— | —(CH$_2$)$_2$CH$_3$ | 111–113 |
| II-13 | —(CH$_2$)$_{10}$— | —(CH$_2$)$_3$CH$_3$ | 114–115 |
| II-14 | —(CH$_2$)$_{10}$— | —(CH$_2$)$_5$CH$_3$ | 113–115 |

The compound (II) used as a starting material for producing the present compounds (I) can preferably be prepared by the following methods (A) to (C) using ω-nitroguanidino acid (III) as a starting material, though the compound (II) may also be produced by other methods.

METHOD (A)

The reactions involved in this method are represented as follows:

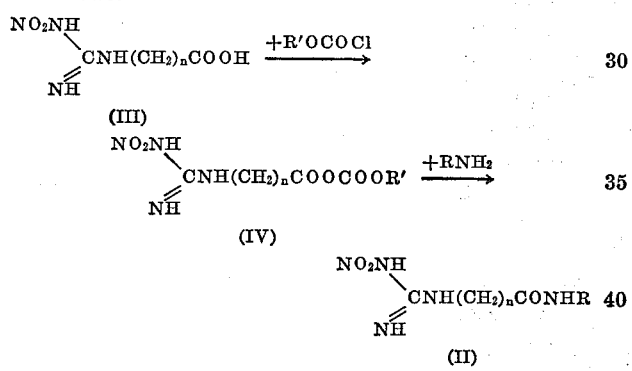

wherein R and $n$ are the same as defined before, and R' is a lower alkyl of 1 to 4 carbon atoms.

The starting ω-nitroguanidino acid (III) is known in the art and may be easily prepared by nitrating ω-guanidino acid with fuming nitric acid at a temperature of —10 to +10° C. The fuming nitric acid may preferably be used in admixture with one or both of fuming sulfuric acid and concentrated sulfuric acid. Ammonium nitrate dissolved in concentrated sulfuric acid may also be used as nitrating agent. Alternatively the ω-nitroguanidino acid (III) may also be prepared by the reaction of ω-amino acid with 2-methyl-1-nitro isourea in an aqueous solution of alkali. This method is known in the art and described in detail in the appended Example 6. As the resultant ω-nitroguanidino acid (III) contains nitroguanidino group which is chemically stable, acid amide derivatives (II) thereof can be produced in a high order of yield with the minimum production of byproducts. The ω-nitroguanidino acid include those acids having $n$ in the formula (III) which varies 1 to 10, but most preferable acid is ω-nitroguanidinocaproic acid in which $n$ is 5.

The reaction of ω-nitroguanidino acid (III) with a lower alkylchlorocarbonate to produce mixed anhydride (IV) may be carried out in the presence of a solvent, such as dimethyl formamide, toluene, chloroform, etc. at a temperature of —10 to +10° C., preferably —5 to 0° C. Preferable alkylchlorocarbonate are ethylchlorocarbonate, isobutylchlorocarbonate, etc. To accelerate the reaction a dehydrochlorinating agent, such as triethyl amine, tri-n-butyl amine and like tertiary bases may be added to the reaction system. The resultant mixed anhydride (IV) is then subjected to the subsequent reaction with a primary amine to produce an ω-nitroguanidino acid amide (II) corresponding to the amine used. Various amines may be used, but primary alkyl amines having 6 to 12 carbon atoms are particularly preferable. The reaction may be carried out at a temperature of —10 to +10° C., preferably —5 to 0° C. The resultant ω-nitroguanidino acid amide (II) may easily be separated from the reaction mixture by adding water thereto.

METHOD (B)

In this method the following reactions are involved:

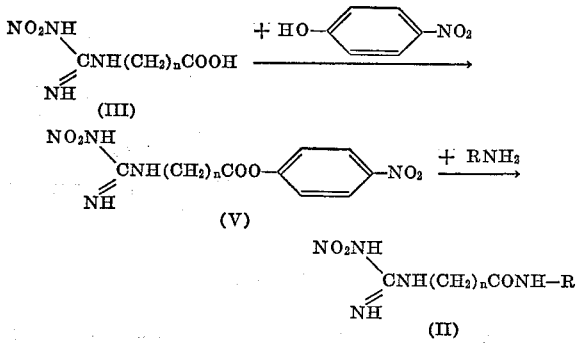

wherein R and $n$ are the same as defined before.

According to this method ω-nitroguanidino acid (III) is reacted with p-nitrophenol to produce p-nitrophenyl ester of ω-nitroguanidino acid (V). This reaction may preferably be carried out in an inert solvent such as N,N-dimethylformamide in the presence of dehydrating agent such as hexylcarbodiimide. The reaction temperature may usually be a room temperature. In the place of p-nitrophenol may be used di-p-nitrophenyl sulfite, tri-p-nitrophenyl phosphite, etc., and in this case the reaction is conducted in a solvent such as pyridine or a mixture of pyridine and ethylacetate at a room temperature or moderately elevated temperature of 50 to 60° C.

The resultant ester (V) is then reacted with a primary amine to produce the desired compound (II). This reaction may be carried out in the presence of solvents such as chloroform, methyl acetate, N,N-dimethyl formamide, etc. The reaction temperature may usually be a room temperature.

METHOD (C)

This method involves the following steps of the reaction:

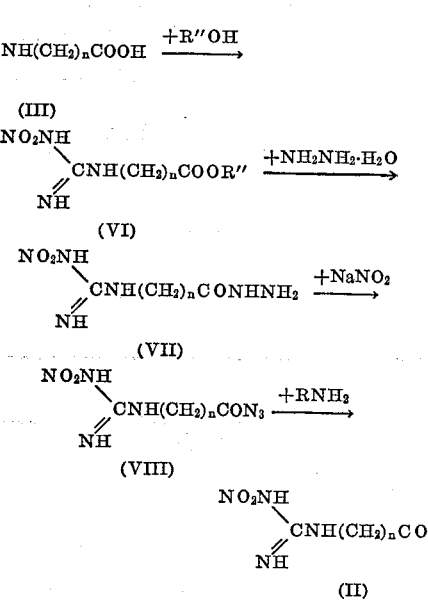

wherein R and $n$ are the same as defined before, and R" is a lower alkyl of 1 to 4 carbon atoms.

The esterification reaction to produce ester (VI) may be carried out by conventional methods. For example, ω- nitroguanidino acid (III) is reacted with a lower alcohol cooled with ice water while introducing dry hydrochloric acid gas. The reaction may also be conducted by refluxing a lower alcohol in the presence of p-toluene sulfonic acid, benzene sulfonic acid, etc. To the resultant ester (VI) is added excess amount of hydrazine and the mixture is left standing at a room temperature or moderately elevated temperature of 50 to 80° C. to produce ω-nitroguanidino acid hydrazide (VII). The hydrazide (VII) is dissolved in hydrochloric acid, acetic acid or like acid and cooled to lower than 0° C., to which sodium nitrite is added, whereby azide (VIII) can be obtained. The resultant azide is reacted with an amine at −10 to +5° C. to produce ω-nitroguanidino acid amide derivative (II).

For better understanding of the invention examples for preparing the present amide derivatives and pharmacological activity thereof are given below:

Example 1

100 ml. of fuming nitric acid was added with stirring to a solution of 60 ml. of fuming sulfuric acid and 40 ml. of concentrated sulfuric acid cooled with ice. While the temperature of the resultant liquid was maintained at lower than 10° C., 65.7 g. of ε-guanidinocaproic acid was further added thereto stepwise. After completion of the addition the solution was further stirred continuously for two hours in the ice bath, and the reaction solution was poured with stirring into 1 kg. of ice, and the precipitated crystals were filtered and washed with water. By recrystallization of the product from hot water 64.8 g. of white needle-like ε-nitroguanidinocaproic acid was obtained. The yield was 78.2 percent.

The resultant product had a melting point of 156.5–158° C. and values found by elementary analysis were as follows:

Calcd. ($C_7H_{14}O_4N_4$) (percent): C, 38.53; H, 6.47; N, 25.68. Found (percent): C, 38.72; H, 6.24; N, 26.00.

43.6 g. of the resultant ε-nitroguanidinocaproic acid was dissolved in 250 ml. of N,N-dimethylformamide, to which 27.7 ml. of triethylamine was added. To the resultant solution was dropwise added with stirring 19 ml. of ethylchlorocarbonate at −5 to 0° C. After the dropwise addition the resultant mixture was further stirred for 15 min. Thereafter a solution of 20.2 g. of n-hexylamine dissolved in 100 ml. of N,N-dimethylformamide was slowly added dropwise to the mixture at −5 to 0° C. After further stirring at the temperature for one hour, the solution was left standing at room temperature overnight. The reaction mixture was poured into water with stirring to precipitate the crystalline solid, which was separated by filtration. Recrystallization from hot water gave 49.7 g. of white scale-like crystals of ε-nitroguanidino-caproyl-n-hexylamide. The yield was 82.4%.

The product has a melting point of 113–114° C. and elementary analysis thereof gave the following results:

Calcd. ($C_{13}H_{27}O_3N_5$) (percent): C, 51.81; H, 9.03; N, 23.24. Found (percent): C, 51.96; H, 8.94; N, 23.41.

63.3 g. of ε-nitroguanidinocaproyl-n-hexylamide thus obtained was dissolved in 350 ml. of glacial acetic acid, to which was added 1.5 g. of palladium black. Hydrogen gas was introduced to the resultant solution at 70 to 80° C. for 10 hours for reduction. After the palladium black used was removed by filtration the reaction mixture was condensed under reduced pressure to precipitate crystalline solid. The acetic acid was removed with ether, and by recrystallization from chloroform-petroleum ether 61.0 g. of white ε-guanidinocaproyl-n-hexylamide acetate was obtained. The yield was 91.8%.

This product had a melting point of 84 to 86° C., and Sakaguchi reaction thereof was positive. The elementary analysis of the compound gave the following results:

Calcd. ($C_{13}H_{28}N_4O \cdot COOH$) (percent): C, 56.93; H, 10.19; N, 17.71. Found (percent): C, 56.64; H, 9.95; N, 17.43.

The pharmacological activity of the above compound was tested with the following results:

(1) Antagonistic action of bradykinin (a) Depressive action on contraction of smooth muscle.—The depressive effect of the present compound to the traction by bradykinin or isolated uterus muscle of a rat was tested and the compound exhibited a marked depressive action at a concentration of $10^{-5}$ m./lit.

The action is by far stronger than various conventional substances having anti-bradykinin action.

(b) Depression of vascular permeability test.—The depressive action of the compound on acceleration of vascular permeability found in intracutaneous administration of bradykinin to rabbits, rats and mice was tested, and a marked depressive action was exhibited with a dose of 10 mg./kg.

(2) Depressive action on edema.—Carrageenin was administered through the heel of a rat, and the depressive action of the compound of the invention on the increase of edema with the passage of time was tested, and the increase of edema was markedly depressed with a dose of 10 mg./kg.

Example 2

21.8 g. of ε-nitroguanidinocaproic acid and 10.1 g. of triethylamine were dissolved in 120 ml. of N,N-dimethylformamide. To the solution cooled to 0 to −5° C. was added dropwise with stirring 10.9 g. of ethylchlorocarbonate. After the addition the mixture was further stirred for 15 min. and 7.3 g. of n-butylamine dissolved in 60 ml. of N,N-dimethylformamide was added dropwise. The resultant mixture was further stirred at 0 to −5° C. for one hour and then left standing at room temperature overnight. The reaction mixture was poured into water with stirring to precipitate crystals. The precipitated crystals were filtered and recrystallized from hot water, whereby 21.1 g. of white crystals of ε-nitroguanidinocaproyl-n-butylamide was obtained. The yield was 77.2%. The compound thus produced had a melting point of 108 to 109° C. and elementary analysis thereof gave the following results:

Calcd. ($C_{11}H_{23}N_5O_3$) (percent): C, 48.34; H, 8.48; N, 25.62. Found (percent): C, 48.64; H, 8.68; N, 25.90.

8.2 g. of ε-nitroguanidinocaproyl-n-butylamide was dissolved in 70 ml. of glacial acetic acid, and 0.5 g. of palladium black was added to the solution. To the resultant mixture hydrogen gas was introduced at 60° C. for 15 hrs. for reduction. After the reaction, palladium black was removed by filtration and the mixture was concentrated under reduced pressure. Recrystallization from ethanol-ether gave 7.7 g. of white crystals of ε-guanidinocaproyl-n-butylamide acetate. The yield was 89.0%. The compound had a melting point of 105–108° C., and Sakaguchi reaction thereof was positive. The elementary analysis of the product gave the following results:

Calcd. ($C_{11}H_{24}N_4O \cdot CH_3COOH$) (percent): C, 54.14; H, 9.79; N, 19.43. Found (percent): C, 54.14; H, 9.61; N, 19.18.

The depressive effect of the compound on the contraction of isolated uterus muscle of rats by bradykinin was tested, and a marked depressive effect was exhibited at the concentration of $10^{-4}$ m./lit.

Example 3

8.7 g. of ε-nitroguanidinocaproic acid and 4.0 g. of triethylamine were dissolved in 40 ml. of N,N-dimethylformamide. To the solution cooled to 0 to −5° C. was dropwise added with stirring 4.3 g. of ethylchlorocarbonate and the mixture was further stirred for 15 min. To the resultant mixture was dropwise added with stirring 4.8 g. of phenethylamide dissolved in 20 ml. of N,N-dimethylformamide. The stirring was continued at 0 to −5° C. for one hour, and the mixture was left standing at room temperature overnight. The reaction mixture was then poured into water with stirring, and the precipitated crystals were filtered. Recrystallization from ethanol-ether gave 9.6 g. of white crystals of ε-nitroguanidinocaproyl-phenethyl-amide. The yield was 75%. The compound had a melting point of 116–117° C. and elementary analysis thereof gave the following results:

Calcd. ($C_{15}H_{23}N_5O_3$) (percent): C, 56.06% H, 7.21; N, 21.79. Found (percent): C, 56.40; H, 7.38; N, 21.59.

4.8 g. of ε-nitroguanidinocaproyl phenethylamide was dissolved in 70 ml. of glacial acetic acid to which was added palladium black. To the resultant mixture was introduced hydrogen gas at room temperature for 20 hrs. After the reaction palladium black was removed by filtration and the mixture was concentrated under reduced pressure. Recrystallization from ethanol-ether gave 3.6 g. of hydroscopic white crystals of ε-guanidinocaproyl phenethylamide acetate. The yield was 72%. The compound had a melting point of 44–47° C. and Sakaguchi reaction thereof was positive. Elementary analysis gave the following results:

Calcd. ($C_{15}H_{24}N_4O \cdot CH_3COOH$) (percent): C, 60.69; H, 8.39; N, 16.65. Found (percent): C, 60.38; H, 8.68; N, 16.55.

The depressive action of the compound on the contraction of isolated uterus muscle of rats by bradykinin was tested and marked effect was exhibited at the concentration of $10^{-3}$ m./lit.

Example 4

3.3 g. of ε-nitroguanidinocaproic acid and 1.5 g. of triethylamine were dissolved in 40 ml. of dimethylformamide. 1.6 g. of ethylchlorocarbonate was dropwised added with stirring to the solution cooled at 0 to −5° C., after which the stirring was continued for 15 min. To the resultant mixture was added dropwise slowly 2.4 g. of n-decylamine dissolved in 20 ml. of N,N-dimethylformamide, and further stirred at 0 to −5° C. for one hour, and left standing at room temperature overnight. The reaction mixture was poured into water with stirring, and the precipitated crystals were filtered and recrystallization from hot ethanol gave 4.5 g. of ε-nitroguanidinocaproyl-n-decylamide. The yield was 83.9%. The compound had a melting point of 127–128° C. and elementary analysis thereof gave the following results:

Calcd. ($C_{17}H_{35}N_5O_3$) (percent): C, 57.12; H, 9.87; N, 19.59. Found (percent): C, 57.37; H, 9.96; N, 19.89.

3 g. of ε-nitroguanidinocaproyl-n-decyl-amide was dissolved in 70 ml. of glacial acetic acid, to which was added palladium black. To the resultant mixture was introduced hydrogen gas at 60° C. for 15 hrs. After the reaction the palladium black was removed by filtration and the mixture was concentrated under reduced pressure. Recrystallization from ethanol-ether gave 2.5 g. white crystals of ε-guanidinocaproyl-n-decylamide acetate. The yield was 80%. The compound had a melting point of 88–89° C., and Sakaguchi reaction thereof was positive. Elementary analysis thereof gave the following results:

Calcd. ($C_{17}H_{36}N_4O \cdot CH_3COOH$) (percent): C, 61.26; H, 10.82; N, 15.04. Found (percent): C, 60.98; H, 11.01; N, 15.40.

The depressive effect of the compound on the contraction of isolated uterus muscle of rats by bradykinin was tested and a marked depressive action was exhibited at $16^{-6}$ m./lit.

Example 5

5.9 g. of ε-nitroguanidinocaproic acid and 2.8 g. of triethylamine were dissolved in 40 ml. of N,N-dimethylformamide. To the solution cooled to 0 to −5° C. was added dropwise with stirring 3.0 g. of ethylchlorocarbonate, after which was further stirred for 15 min. 5 g. of laurylamine dissolved in 100 ml. of N,N-dimethylformamide was dropwise added to the solution and after the stirring was continued at the temperature for one hour the mixture was left standing overnight.

The resultant reaction mixture was poured into water with stirring, and the precipitated crystals were filtered. By recrystallization from hot ethanol 8.5 g. of white crystals of ε-nitroguanidinocaproyl-laurylamide was obtained at the yield rate of 81.7%. The compound had a melting point of 129 to 130° C. and elementary analysis thereof gave the following results:

Calcd. ($C_{19}H_{29}N_5O_3$) (percent): C, 59.19; H, 10.20; N, 18.16. Found (percent): C, 59.49; H, 10.35; N, 18.35.

5 g. of ε-nitroguanidinocaproyl-laurylamide was suspended in 60 ml. of glacial acetic acid, to which palladium black was added. To the suspension was introduced hydrogen gas at 70–80° C. for 15 hrs. After the reaction palladium black was removed by filtration and the mixture was concentrated under reduced pressure. Recrystallization from ethanol-ether gave 4.4 g. of white crystals of ε-guanidinocaproyl-laurylamide acetate at the yield of 84.6%. The compound had a melting point of 99–102° C. and Sakaguchi reaction thereof was positive. The elementary analysis of the compound gave the following results:

Calcd. ($C_{19}H_{40}N_4O \cdot CH_3COOH$) (percent): C, 62.96; H, 11.07; N, 13.99. Found (percent): C, 62.81; H, 11.00; N, 14.22.

The depressive effect of the compound on the contraction of isolated uterus muscle by bradykinin was tested and a marked depressive action was exhibited at $10^{-4}$ m./lit.

Example 6

5.4 g. of ε-aminocaproic acid was dissolved in a mixture of 40 ml. of water and 20 ml. of 2 N-sodium hydroxide. To the solution was added slowly 4.8 g. of 2-methyl-1-nitroisourea at room temperature and after stirring for 2 hrs. the mixture was acidified with hydrochloric acid to precipitate crystals. The precipitated crystals were filtered and recrystalized from hot water, whereby 3.8 g. of white needle-like ε-nitroguanidinocaproic acid having a melting point of 156 to 158° C. was obtained. Elementary analysis thereof gave the following results:

Calcd. ($C_7H_{14}O_4N_4$) (percent): C, 38.53; H, 6.47; N, 25.68. Found (percent): C, 38.23; H, 6.42; N, 25.78.

ε-nitroguanidinocaproic acid was also prepared by nitration of ε-guanidinocaproic acid as illustrated below:

8.7 g. of ε-guanidinocaproic acid was dissolved in 20 ml. of concentrated sulfuric acid cooled with ice water. To the solution was further added with stirring 5.2 g. of ammonium nitrate and the stirring was continued for two hrs. The resultant mixture was thereafter poured into ice water and the precipitated crystals were recrystallized from hot water, whereby 6.3 g. of white needle-like ε-nitroguanidinocaproic acid having melting point of 156 to 158° C. was obtained. Elementary analysis gave the following results:

Calcd. ($C_7H_{14}O_4N_4$) (percent): C, 38.53; H, 6.47; N, 25.68. Found (percent): C, 38.59; H, 6.52; N, 25.84.

4.3 g. of ε-nitroguanidinocaproic acid thus obtained and 3.1 g. of p-nitrophenol were dissolved in 30 ml. of N,N-dimethylformamide, and 4.4 g. of dicyclohexylcarbodiimide was added at room temperature to the solution. After stirring for 3 hrs. the precipitated substance was filtered out and water was added to the filtrate to precipitate the crystals. By recrystallization from N,N-dimethylformamide-water was obtained 2.8 g. of yellow powdery p-nitrophenyl ester of ε-nitroguanidinocaproic acid having a melting point of 111 to 112.5° C. Elementary analysis thereof gave the following results:

Calcd. ($C_{13}H_{17}O_6N_5$) (percent): C, 46.03; H, 5.05; N, 20.65. Found (percent): C, 45.72; H, 5.17; N, 20.48.

3.4 g. of p-nitrophenyl ester of ε-nitroguanidinocaproic acid and 1.0 g. of n-hexylamine were dissolved in 40 ml. of N,N-dimethylformamide, and the solution was left standing at room temperature overnight. Water was thereafter added to the mixture to precipitate the crystals, and by recrystallization from ethanol-ether 2.3 g. of white powdery ε-nitroguanidinocaproyl-n-hexylamide, melting at 113 to 114° C., was obtained. The resultant ε-nitroguanidinocaproyl-n-hexylamide was reduced in the same method as in Example 1 to give ε-guanidinocaproyl-n-hexylamide acetate melting at 84 to 86° C., was obtained.

Example 7

21.8 g. of ε-nitroguanidinocaproic acid was suspended in 450 ml. of methanol, and while introducing dry hydrochloric acid gas under cooling with ice, the suspension was stirred for estrification until the acid was thoroughly dissolved. The resultant reaction mixture was concentrated under reduced pressure and water was added to the residue to precipitate the crystals. By recrystallization from methanol-ether 11 g. of white needle-like methyl ester of ε-nitroguanidinocaproic acid, melting at 99 to 100° C. was obtained. Elementary analysis thereof gave the following result:

Calcd. ($C_8H_{16}N_4O_4$) (percent): C, 41.37; H, 6.94; N, 24.12. Found (percent): C, 41.33; H, 7.19; N, 24.30.

8.1 g. of the methyl ester of ε-nitroguanidinocaproic acid thus obtained was dissolved in 60 ml. of methanol. To the solution was added 4.3 g. of 80% hydrazinehydrate and left standing for 4 hrs. at room temperature, after which ether was added thereto to precipitate the crystals. Recrystallization from ethanol-ether gave 4 g. of white ε-nitroguanidinocaproylhydrazine, melting at 141 to 145° C. Elementary analysis thereof gave the following results:

Calcd. ($C_7H_{16}N_6O_3$) (percent): C, 36.20; H, 6.94; N, 36.19. Found (percent): C, 36.60; H, 7.24; N, 35.90.

2.4 g. of ε-nitroguanidinocaproylhydrazide was dissolved in 25 ml. of 1 N-hydrochloric acid, to which was added under cooling 12 ml. of 1 N-sodium nitrite. The precipitated product was extracted with ethyl acetate and to the acetate layer was added under cooling 1 g. of n-hexylamine dissolved in 10 ml. of ether. After stirring for two hrs. the mixture was left standing overnight. Thereafter ether was further added thereto and the precipitated crystals were filtered. Recrystallization from ethanol-ether gave 1.3 g. of white ε-nitroguanidinocaproyl-n-hexylamide, melting at 113 to 114° C., was obtained. The resultant ε-nitroguanidinocaproyl-n-hexylamide was reduced in the same manner as in Example 1 to give ε-guanidinocaproyl-n-hexylamide acetate melting at 84 to 86° C.

What we claim is:

1. An ω-nitroguanidino acid amide derivative having the structural formula

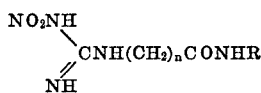

wherein R is an alkyl of 2 to 18 carbon atoms and *n* is an integer of 1 to 10.

2. A process for manufacturing a ω-guanidino acid amide having the structural formula:

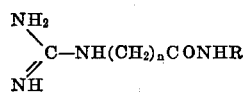

wherein R is an alkyl of 2 to 18 carbon atoms, a phenylalkyl ($C_1$ to $C_4$) or a phenyl containing or not containing a substitute of hydroxyl, alkyl ($C_1$ to $C_4$) or haloalkyl ($C_1$ to $C_4$), and *n* is an integer of 1 to 10, which comprises reducing with hydrogen gas a ω-nitroguanidino acid amide having the structural formula:

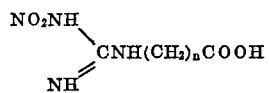

wherein R and *n* are as defined above.

3. The process of 2 wherein the ω-nitroguanidino acid amide is obtained by reacting ω-nitroguanidino acid having the structural formula:

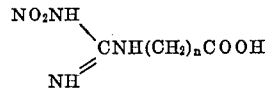

wherein *n* is an integer of 1 to 10, with a lower alkylchlorocarbonate having the structural formula:

wherein $R^1$ is lower alkyl to produce mixed anhydride having the structural formula:

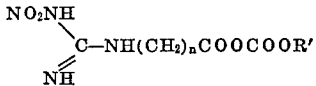

wherein $R^1$ and *n* are as defined before and then reacting said mixed anhydride with a primary amine having the structural formula:

$RNH_2$ wherein R is as defined in claim 2 to produce said ω-nitroguanidino acid amide.

4. The process of claim 2 wherein the ω-nitroguanidino acid amide is obtained by reaction ω-nitroguanidino acid having the structural formula:

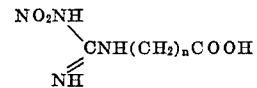

wherein *n* is an integer of 1 to 10 with a nitro compound selected from the group consisting of p-nitrophenol, di-p-nitrophenyl sulfite or tri-p-nitrophenyl phosphite to produce the p-nitrophenyl ester of ω-nitroguanidino acid having the structural formula:

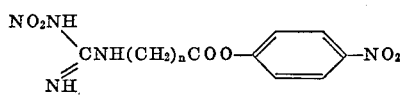

wherein *n* is as defined before, and then reacting said p-nitrophenyl ester of ω-nitroguanidino acid with a primary amine having the structural formula:

$RNH_2$ wherein R is as defined in claim 2 to produce said ω-nitroguanidino acid amide.

5. The process of claim 2 wherein the ω-nitroguanidino acid amide is obtained by reacting ω-nitroguanidino acid having the structural formula:

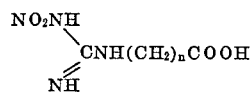

wherein *n* is an integer of 1 to 10, with a lower alkanol having the structural Formula $R^{11}OH$ wherein $R^{11}$ is lower alkyl to produce an alkyl ester of ω-nitroguanidino acid having the structural formula:

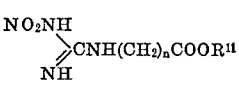

wherein $R^{11}$ and *n* is as defined before, reacting said alkyl ester of ω-guanidino acid with hydrazine to produce ω-nitroguanidino hydrozide having the structural formula:

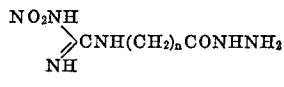

reacting said hydrazide with sodium nitrite to produce an azide having the structural formula:

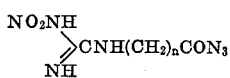

wherein $n$ is as defined before, and reacting said azide with a primary amine having the structural formula:

$$RNH_2$$

wherein R is as defined in claim 2 to produce said ω-nitroguanidino acid amide.

References Cited

FOREIGN PATENTS 59,24M   4/1968   France _____ 260—561 A

LEWIS GOTTS, Primary Examiner

E. G. LOVE, Assistant Examiner

U.S. Cl. X.R.

260—463, 561 A, 562 N; 424—320